United States Patent
Han et al.

(10) Patent No.: US 8,615,147 B2
(45) Date of Patent: Dec. 24, 2013

(54) OPTICAL SWITCH DEVICE AND METHOD OF MANUFACTURING THE SAME

(75) Inventors: Young-Tak Han, Daejeon (KR); Jang Uk Shin, Daejeon (KR); Sang Ho Park, Daejeon (KR); Sang-Pil Han, Daejeon (KR); Yongsoon Baek, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 307 days.

(21) Appl. No.: 12/987,492

(22) Filed: Jan. 10, 2011

(65) Prior Publication Data

US 2012/0020614 A1    Jan. 26, 2012

(30) Foreign Application Priority Data

Jul. 21, 2010    (KR) ........................ 10-2010-0070579

(51) Int. Cl.
*G02B 6/26* (2006.01)

(52) U.S. Cl.
USPC .............................................. 385/18; 385/39

(58) Field of Classification Search
USPC .................................... 385/17–18, 39–46, 95
See application file for complete search history.

(56) References Cited

U.S. PATENT DOCUMENTS

| | | | |
|---|---|---|---|
| 4,753,505 A * | 6/1988 | Mikami et al. ..................... 385/5 |
| 5,970,186 A * | 10/1999 | Kenney et al. .................. 385/16 |
| 6,311,004 B1 | 10/2001 | Kenney et al. | |
| 6,356,679 B1 * | 3/2002 | Kapany ............................ 385/18 |
| 6,546,163 B2 | 4/2003 | Thackara | |
| 2002/0034352 A1 * | 3/2002 | Williams et al. ................ 385/16 |
| 2002/0041726 A1 * | 4/2002 | Thackara ........................ 385/16 |
| 2002/0106175 A1 * | 8/2002 | Binkley et al. ................. 385/132 |
| 2002/0154852 A1 * | 10/2002 | Levine et al. .................... 385/16 |
| 2003/0228091 A1 * | 12/2003 | Lee et al. ........................ 385/18 |
| 2004/0141691 A1 * | 7/2004 | Wiesmann et al. ............. 385/40 |
| 2007/0081763 A1 * | 4/2007 | Wang .............................. 385/18 |
| 2009/0263068 A1 * | 10/2009 | Nayyer ............................. 385/9 |

FOREIGN PATENT DOCUMENTS

| | | | | |
|---|---|---|---|---|
| JP | 10-14264 A | 5/1998 | | |
| JP | 10142641 A | * 5/1998 | ............. G02F 1/313 |
| JP | 2005-275100 A | 10/2005 | | |
| KR | 10-0350413 | 8/2002 | | |
| KR | 10-0717421 | 5/2007 | | |
| KR | 10-0960919 | 5/2010 | | |

OTHER PUBLICATIONS

Takashi Goh, et al., "High-Extinction Ratio and Low-Loss Silica-Based 8×8 Thermooptic Matrix Switch", IEEE Photonics Technology Letters, Mar. 1998, vol. 10, No. 3, pp. 358-360.

Takashi Goh, et al., "Low Loss and High Extinction Ratio Strictly Nonblocking 16×16 Thermo-optic Matrix Switch on 6-in Wafer Using Silica-Based Planar Lightwave Circuit Technology", Journal of Lightwave Technology, Mar. 2001, vol. 19, No. 3, pp. 371-379.

* cited by examiner

*Primary Examiner* — Mark Robinson
*Assistant Examiner* — Peter Radkowski
(74) *Attorney, Agent, or Firm* — Rabin & Berdo, P.C.

(57) ABSTRACT

Provided are an optical switch device having a simple light path and capable of achieving high speed switching, and a method of manufacturing the optical switch device. The optical switch device comprises one or more first optical waveguides extending in a first direction, one or more second optical waveguides connected to the first optical waveguides in a second direction crossing the first direction, and one or more switching parts configured to control light transmitted in the first direction within the first optical waveguide connected with the second waveguide, to selectively reflect the light to the second waveguide extending in the second direction.

17 Claims, 19 Drawing Sheets

OPTICAL SWITCH DEVICE AND METHOD OF MANUFACTURING THE SAME

CROSS-REFERENCE TO RELATED APPLICATIONS

This U.S. non-provisional patent application claims priority under 35 U.S.C. §119 of Korean Patent Application No. 10-2010-0070579, filed on Jul. 21, 2010, the entire contents of which are hereby incorporated by reference.

BACKGROUND OF THE INVENTION

The present invention disclosed herein relates to an optical switch device and a method of manufacturing the optical switch device, and more particularly, to an optical switch device used in optical communication systems, and a method of manufacturing the optical switch device.

Recently, high capacity, high speed, and high performance of optical communication systems are being increasingly required. For example, the optical communication systems may include an optical communication system using a wavelength division multiplexing (WDM) method and an optical communication system using a reconfigurable optical add-drop multiplexing (ROADM) method. For example, in the optical communication system using the ROADM method, since several channels are connected to each other at the same time, a network can be improved in utilization. Also, costs can be reduced, and a network structure can be simplified.

An optical switch device is one of important elements constituting the optical communication systems. Such optical switch devices attenuate light and change the path thereof to switch the light. For example, an external adjustment may decrease the intensity of an optical signal passing through an optical switch device or may change the path of light. The optical switch devices may switch an optical signal by using an attenuation amount of the optical signal and a path change of light.

However, as optical communication industries are developed, the optical communication systems may require optical switch devices having various functions. Thus, various types of research are being carried out on optical switches having novel functions.

SUMMARY OF THE INVENTION

The present invention provides a miniaturized optical switch device having a simple light path changing structure, and a method of manufacturing the optical switch device.

The present invention also provides an optical switch device capable of minimizing an optical loss, and a method of manufacturing the optical switch device.

The present invention also provides an optical switch device capable of achieving high speed switching, and a method of manufacturing the optical switch device.

The present invention also provides an optical switch device comprising a switching part that is disposed between first and second optical waveguides and having a variable refractive index according to heat or an electric field to selectively transmit or reflect light.

Embodiments of the present invention provide optical switch devices comprising: one or more first optical waveguides extending in a first direction; one or more second optical waveguides connected to the first optical waveguides in a second direction crossing the first direction; and one or more switching parts configured to control light transmitted in the first direction within the first optical waveguide connected with the second waveguide, to selectively reflect the light to the second waveguide extending in the second direction.

In some embodiments, the switching part may comprise: a selective reflection part configured to transmit or reflect light; and a control part configured to control the transmitting and reflecting of the light at the selective reflection part. The selective reflection part may have a variable refractive index according to temperature or an electric field. The switching part may have a variable light critical angle according to the refractive index on an interface between the selective reflection part and the first optical waveguide.

In other embodiments, the selective reflection part may comprise a thermo-optic polymer having a variable refractive index according to temperature. The thermo-optic polymer may have the same refractive index as that of silica or silicon oxide of the first optical waveguide at a room temperature. The thermo-optic polymer may transmit or reflect light propagating within the first optical waveguide. The thermo-optic polymer may have a smaller refractive index than that of the silica or silicon oxide at high temperature. The thermo-optic polymer may totally reflect light propagating within the first optical waveguide. Thus, the selective reflection part may transmit or reflect light according to temperature. The optical switch devices may further comprise an upper clad and a lower clad disposed respectively on an upper side and a lower side of the first and second optical waveguides, wherein the selective reflection part comprises a core thermo-optic polymer disposed within the first optical waveguide, and upper and lower thermo-optic polymers disposed respectively within the upper clad and the lower clad.

In still other embodiments, the control part may comprise a heater electrode heating the thermo-optic polymer. The heater electrode may have a smaller line width than that of the upper thermo-optic polymer in a trench, and be disposed on the upper clad and the upper thermo-optic polymer. The heater electrode may control the heating of the thermo-optic polymer. Thus, the heater electrode may control the transmission and total reflection of the thermo-optic polymer.

In even other embodiments, the selective reflection part may comprise an electro-optic polymer having a variable refractive index according to a change of an electric field. The electro-optic polymer may comprise a material, the refractive index of which quickly changes according to the direction and intensity of an electric field. When the refractive index of the electro-optic polymer is same as that of the silica or silicon oxide of the first optical waveguide, the electro-optic polymer may transmit light. When the refractive index of the electro-optic polymer is significantly lower than that of the silica or silicon oxide of the first optical waveguide, the electro-optic polymer may totally reflect light. The optical switch device may further comprise an upper clad and a lower clad disposed respectively on an upper side and a lower side of the first and second optical waveguides, wherein the selective reflection part comprises a core electro-optic polymer disposed within the first optical waveguide, and upper and lower electro-optic polymers disposed respectively within the upper clad and the lower clad.

In yet other embodiments, the control part may comprise upper and lower electrodes applying the electric field to the electro-optic polymer at the upper and lower sides of the electro-optic polymer. A radio frequency electrical signal may be applied to the upper and lower electrodes. Thus, the electro-optic polymer may quickly switch the transmission and reflection of light through an electric field that is quickly varied between the upper and lower electrodes by the radio frequency electrical signal. The upper electrode may have a smaller line width than that of the upper electro-optic polymer in a trench, and be disposed on the upper clad and the upper electro-optic polymer, and the lower electrode may be disposed on an entire surface below the lower clad and the lower electro-optic polymer.

In further embodiments, the switching part may extend in a third direction between the first direction and the second direction.

In still further embodiments, the number of the second optical waveguides connected in the second direction to the first optical waveguide may be N, and the number of the switching parts may be 1×N. The 1×N switching parts disposed in the first optical waveguide may extend in the third direction wherever the second optical waveguides are connected to the first optical waveguide. The first optical waveguide may be connected to an input end and a first output end, and the second optical waveguides may be connected to from second to N+1$^{th}$ output ends. The number of the output ends may be greater by one than that of the switching parts.

In even further embodiments, the number of the first optical waveguides extending in the first direction may be M, and the number of the second optical waveguides extending in the second direction may be N, and the M first optical waveguides and the N second optical waveguides are arrayed in a matrix form, and the number of the selective reflection parts may be M×N. The switching parts may extend in the third direction wherever the second optical waveguides cross the first optical waveguides. The M first optical waveguides may be connected respectively to M input ends, and the N second optical waveguides may be connected respectively to N output ends.

In yet further embodiments, the first optical waveguides extending in the first direction may be connected to each other through the second optical waveguide, and a pair of the switching parts may be parallel to each other in the first optical waveguides. The switching parts may extend in a fourth direction wherever the second optical waveguides extending in the second direction and disposed between the first optical waveguides extending in the first direction are connected to the first optical waveguides. In the same manner, the switching parts may extend in a fifth direction wherever the second optical waveguides extending in the third direction and disposed between the first optical waveguides are connected to the first optical waveguides.

In other embodiments, methods of manufacturing an optical switch device comprise: forming a lower clad on a substrate; forming a first optical waveguide and a second optical waveguide on the lower clad; forming an upper clad on the first optical waveguide and the second optical waveguide; forming a trench passing through the upper clad and the first optical waveguide and having a bottom exposing the lower clad; forming a selective reflection part within the trench; and forming an electrode on the selective reflection part.

In some embodiments, the forming of the selective reflection part may comprise: forming a lower reflection part disposed in the bottom of the trench and having the same level as that of an upper surface of the lower clad; forming a core reflection part disposed on the lower reflection part and having the same level as those of the first and second optical waveguides; and forming an upper reflection part disposed on the core reflection part and having the same level as that of the upper clad.

In other embodiments, the methods may further comprise forming a lower electrode on an entire surface between the substrate and the lower clad. The lower electrode may comprise a metal having high conductivity.

BRIEF DESCRIPTION OF THE FIGURES

The accompanying figures are included to provide a further understanding of the present invention and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Figure 1:
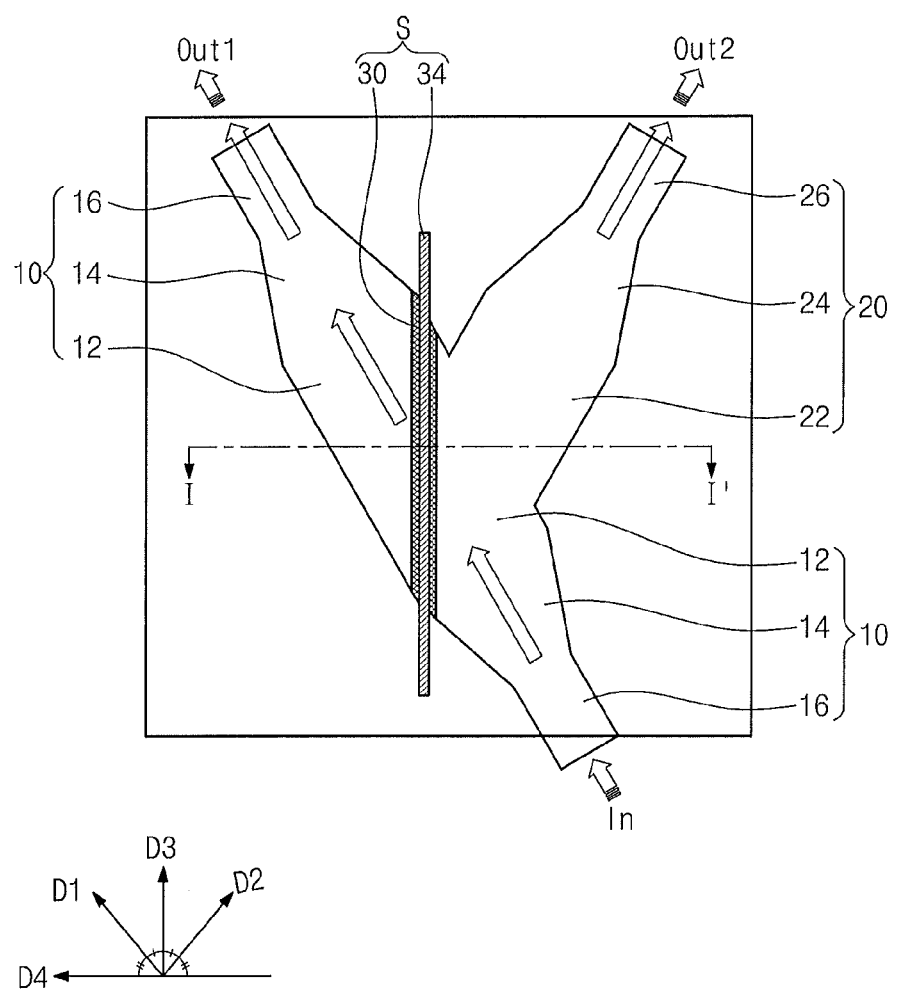
FIG. 1 is a plan view illustrating an optical switch device according to an embodiment of the present invention.

Preferred embodiments of the present invention will be described below in more detail with reference to the accompanying drawings. Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete and will fully convey the scope of the present invention to those skilled in the art. Like reference numerals refer to like elements throughout.

In the following description, the technical terms are used only for explaining a specific exemplary embodiment while not limiting the inventive concept. The terms of a singular form may include plural forms unless referred to the contrary. The meaning of 'comprises' and/or 'comprising' specifies a property, a region, a fixed number, a step, a process, an element and/or a component, but does not exclude other properties, regions, fixed numbers, steps, processes, elements and/or components. Since exemplary embodiments are provided below, the order of the reference numerals given in the description is not limited thereto.

Figure 2:
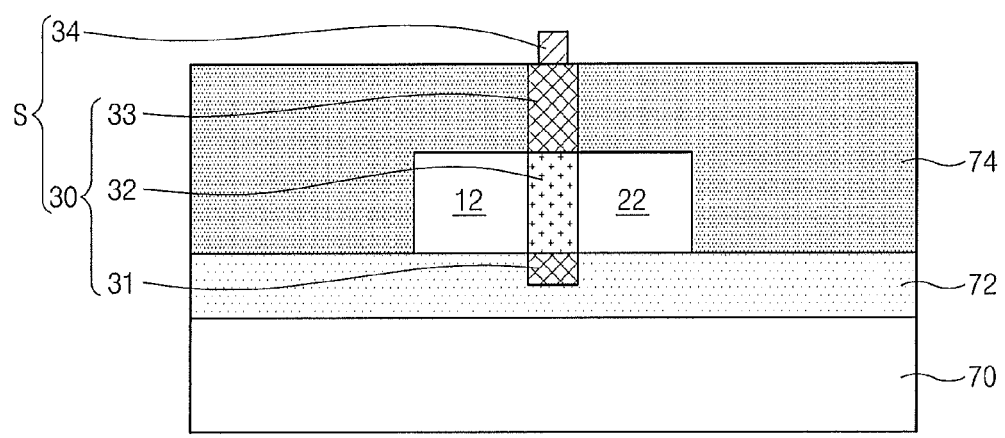
FIG. 2 is a cross-sectional view taken along line I-I' of FIG. 1.

FIG. 1 is a plan view illustrating an optical switch device according to an embodiment of the present invention. FIG. 2 is a cross-sectional view taken along line I-I' of FIG. 1.

Referring to FIGS. 1 and 2, the optical switch device may include a switching part S. The switching part S controls light transmitted within a first optical waveguide 10 extending in a first direction D1 on a substrate 70 and selectively reflects the light to a second optical waveguide 20 connected to the first optical waveguide 10 and extending in a second direction D2. The switching part S may include a selective reflection part 30 that has a variable refractive index according to temperature and a heater electrode 34 that varies the temperature of the selective reflection part 30. The selective reflection part 30, which varies a critical angle of light according to a variation of the refractive index, transmits light in the first direction D1 to the first optical waveguide 10 or reflects light in the second direction D2 to the second optical waveguide 20.

Accordingly, the optical switch device according to the embodiment of the inventive concept may have a simple structure for changing a light path.

The first and second optical waveguides 10 and 20 may be disposed between a lower clad 72 and an upper clad 74. The first and second optical waveguides 10 and 20 may include silica or silicon oxide doped with impurities. The lower clad 72 and the upper clad 74 may surround the first and second optical waveguides 10 and 20. The lower clad 72 and the upper clad 74 may be disposed on the lower and upper sides of the first and second optical waveguides 10 and 20, respectively. The lower clad 72 may be flatly formed below the first and second optical waveguides 10 and 20. The upper clad 74 may be disposed on the upper and side surfaces of the first and second optical waveguides 10 and 20. The lower clad 72 and the upper clad 74 may include silica or silicon oxide.

The first optical waveguide 10 may include first single mode cores 16 through which light is input and output, a first multi mode core 12 disposed between the first single mode cores 16, and first tapering cores 14 connecting the first multi mode core 12 to the first single mode cores 16.

The first single mode cores 16 transmit only the light corresponding to a single eigen mode within a predetermined wavelength band. A mode may include light that satisfies a waveguiding condition and travels within the first and second optical waveguides 10 and 20. Hereinafter, a mode will be described as the equivalent or same concept as light. The first single mode cores 16 may be connected to optical fibers (not shown) disposed out of the substrate 70. In more detail, the first single mode cores 16 may be connected to an input end In and a first output end Out1. For example, the first single mode cores 16 may have a width/height ranging from about 3 μm to about 10 μm.

The first multi mode core 12 may be connected in the first direction D1 to the first single mode cores 16 through the first tapering cores 14. The first multi mode core 12 can guide multi modes including a single mode within a predetermined wavelength band. The first multi mode core 12 can transmit a mode, passing through the switching part S, in the first direction D1. The first multi mode core 12 can transmit a mode, totally reflected from the switching part S, to a second multi mode core 22. The first and second multi mode cores 12 and 22 may be disposed substantially at the same level. The first and second multi mode cores 12 and 22 may include silica or silicon oxide doped with the same impurities. For example, the first multi mode core 12 may have a width/height ranging from about 20 μm to about 60 μm.

The first tapering cores 14 symmetrically are connected to the first single mode cores 16 on both sides of the first multi mode core 12. The first tapering cores 14 may have a tapered hexahedron shape to gradually buffer the width differences between the first multi mode core 12 and the first single mode cores 16. The first tapering cores 14 may extend in the first direction D1 in proportion to the width differences between the first multi mode core 12 and the first single mode cores 16. A propagation of light within the first tapering cores 14 is as follows. Light input from the first single mode core 16 adiabatically increases in mode size without exciting high-order modes at the first tapering core 14, so that the light can travel to the first multi mode core 12. In the same manner, light propagating within the first multi mode core 12 adiabatically decreases in mode size at the first tapering core 14, so that the light can travel to the first single mode core 16. Thus, the first tapering cores 14 of the first optical waveguide 10 can minimize the loss due to high-order modes.

The second optical waveguide 20 may include the second multi mode core 22 connected to the first multi mode core 12 of the first optical waveguide 10, a second single mode core 26 that output light propagating within the second multi mode core 22, and a second tapering core 24 disposed between the second single mode core 26 and the second multi mode core 22.

In the same manner as that of the first multi mode core 12, the second multi mode core 22 transmits a mode in a predetermined wavelength band. The second multi mode core 22 transmits a mode, totally reflected from the switching part S, in the second direction D2. The first and second multi mode cores 12 and 22 may be disposed substantially at the same level. The first and second multi mode cores 12 and 22 may have the same line width and thickness. The first and second multi mode cores 12 and 22 may include silica or silicon oxide doped with the same impurities. In this case, there may be no boundary between the first and second multi mode cores 12 and 22.

Light, which propagates in the second direction D2 through the second multi mode core 22 and the second tapering core 24, may be output to a second output end Out2 by the second single mode core 26. The second single mode core 26 may be connected to an optical fiber (not shown). For example, the second single mode core 26 may have a width ranging from about 3 μm to about 10 μm.

The second tapering core 24 connects the second multi mode core 22 to the second single mode core 26. The second tapering core 24 may have a tapered hexahedron shape to gradually buffer the width differences between the second multi mode core 22 and the second single mode core 26. The second tapering core 24 may extend in the second direction D2 in proportion to the width differences between the second multi mode core 22 and the second single mode core 26. The second tapering core 24 adiabatically decreases the size of a mode propagating within the second multi mode core 22 to transmit the mode to the second single mode core 26.

The switching part S may be disposed at a cross or junction region where the first and second multi mode cores 12 and 22 are connected to each other. The switching part S may extend in a third direction D3 between the first and second directions D1 and D2. An angle between the first direction D1 and the third direction D3 and an angle between the second direction D2 and the third direction D3 may be symmetrically the same. The switching part S may be inclined at a predetermined angle from the first multi mode core 12.

As mentioned above, the switching part S may include the selective reflection part 30 and the heater electrode 34. The heater electrode 34, as a control part varying the temperature of the selective reflection part 30, heats the selective reflection part 30. The heater electrode 34 may include a resistive metal that is heated by electrical power applied from a plurality of terminals (not shown).

The selective reflection part 30 may include a lower reflection part 31 having the same upper surface as that of the lower clad 72, a core reflection part 32 disposed on the lower reflection part 31 having the same level as that of the first and second optical waveguides 10 and 20, and an upper reflection part 33 disposed on the core reflection part 32 and having the same lower surface as that of the upper clad 74. At a room temperature, the lower reflection part 31 and the lower clad 72 may have the same refractive index, and the upper reflection part 33 and the upper clad 74 may have the same refractive index. The core reflection part 32 and the first multi mode core 12 may have the same refractive index at the room temperature. The core reflection part 32 may be disposed within the first multi mode core 12.

The refractive index of the core reflection part 32 may be varied according to temperature. Light propagating in the first direction D1 from the first multi mode core 12 may be transmitted or totally reflected by the selective reflection part 30 according to the variation of the refractive index. Substantially, light is transmitted through or totally reflected from an interface between the first multi mode core 12 and the core reflection part 32. Thus, the light path of propagating within the first multi mode core 12 is changed by the core reflection part 32 according to the variation of temperature.

For example, the selective reflection part 30 may include thermo-optic polymer, the refractive index of which is decreased as the temperature increases. The thermo-optic polymer may include a material having a large negative thermo-optic coefficient, and the refractive index of the material quickly changes in inverse proportion to temperature. Although the refractive index of silica or silicon oxide increases as temperature increases, because the silica or silicon oxide has a small thermo-optic coefficient, it has significantly smaller refraction index variation than the thermo-optic polymer. The refractive index of the thermo-optic polymer may vary in inverse proportion to temperature. For example, the thermo-optic polymer may include lower and upper thermo-optic polymers corresponding respectively to the lower and upper reflection parts 31 and 33, and a core thermo-optic polymer corresponding to the core reflection part 32.

The thermo-optic polymer may have the same refractive index as that of silica or silicon oxide at the room temperature. The core reflection part 32 may transmit or reflect light propagating within the first multi mode core 12. When the thermo-optic polymer has the same refractive index as that of silica or silicon oxide, light passes through, without refraction, the interface between the first multi mode core 12 and the core reflection part 32.

However, when the thermo-optic polymer is heated by the heater electrode 34, its refractive index may be smaller than that of silica or silicon oxide. At the interface between the first multi mode core 12 and the selective reflection part 30, light propagating in the first direction D1 is reflected in the second direction D2 to the second multi mode core 22 by the selective reflection part 30. When light is incident from the first multi mode core 12 having a large refractive index to the thermo-optic polymer having a small refractive index, the light may be reflected. An incident angle that the light starts to be reflected may be a critical angle.

When the incident angle is smaller than the critical angle, light tends to be reflected and transmitted. When the incident angle is greater than the critical angle, light tends to be totally reflected. The critical angle may be expressed using a refractive index ratio between the first multi mode core 12 and the selective reflection part 30 according to Snell's law. The refractive index of the selective reflection part 30 is varied by temperature from the heater electrode 34, so as to vary the critical angle of light propagating in the first direction D1. As the refractive index of the selective reflection part 30 decreases, the critical angle of the selective reflection part 30 also decreases, so that light propagating in the first direction D1 can be totally reflected.

The incident angle may be formed by the first direction D1 and a fourth direction D4 perpendicular to the third direction D3. When light propagating in the first direction D1 passes in the third direction D3 along a surface of the selective reflection part 30, the critical angle is an angle between the fourth direction D4 and the first direction D1. When light is incident at a greater angle than the critical angle, the light is totally reflected at the interface between the selective reflection part 30 and the first multi mode core 12.

An incident angle and a reflection angle of light is the same according to Snell's law. The incident angle may be formed by the first direction D1 and the fourth direction D4. The reflection angle may be formed by the second direction D2 and the fourth direction D4. As the refractive index of the selective reflection part 30 decreases, light propagating in the first direction D1 within the first multi mode core 12 is totally reflected in the second direction D2 by the selective reflection part 30.

Thus, the optical switch device may be turned on/off according to temperature from the heater electrode 34 heating the selective reflection part 30 of the thermo-optic polymer.

Figure 3A:
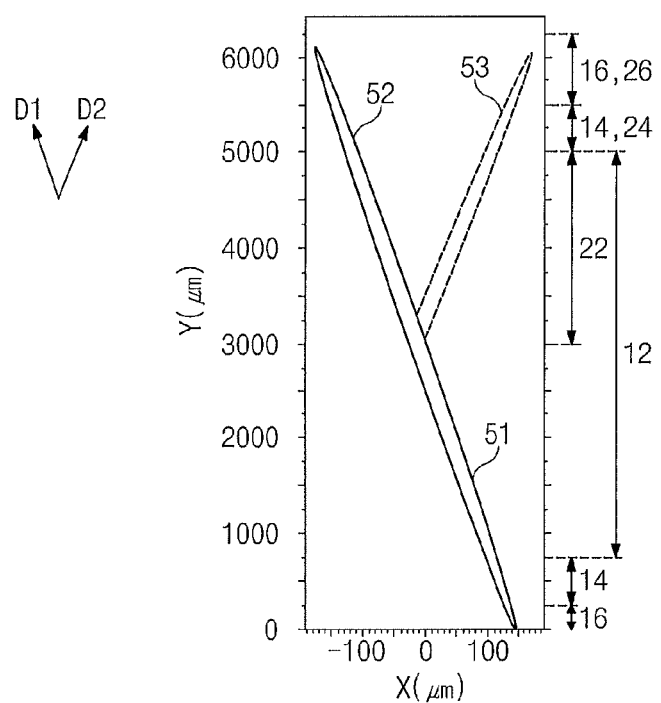
FIGS. 3A and 3B are graphs illustrating results of an overlap integral calculation with a transmission component of light incident in an off state and a reflection component of the light.
Figure 3B:
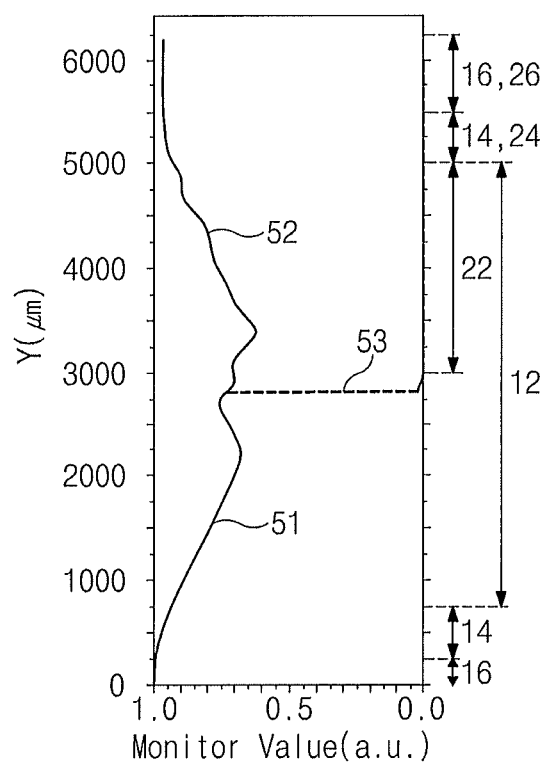

FIGS. 3A and 3B are graphs illustrating a transmission component of light incident in an off state and a reflection component of the light whose results are calculated by the overlap integral.

Referring to FIGS. 3A and 3B, when the selective reflection part 30 is turned off, an incident component 51 of light may propagate in the first direction D1, and a transmission component 52 thereof may propagate in the first direction D1. In FIG. 3A, an X-axis and a Y-axis are used to express the position of the first and second optical waveguides 10 and 20 of FIG. 1. The horizontal axis of FIG. 3B denotes a variation in a normalized energy value, and the vertical axis denotes distances in the third direction D3 of FIG. 1.

The transmission component 52 of incident light may be determined using overlap integral calculation with the incident light and the transmission component 52. When optical power normalized to 1 is input in the first direction D1, the transmission component 52 of about 0.9708 may be output in the first direction D1. The optical power of about 0.0292 may be lost in the reflection component 53 at the selective reflection part 30. The reflection component 53 may be output in the second direction D2.

A ratio of the reflection component 53 to the incident component 51 may be converted to a decibel (dB) using the common logarithm. Thus, in the off state of the selective reflection part 30, the light may be transmitted in the first direction D1 with a loss of about −0.12 dB.

Figure 4A:
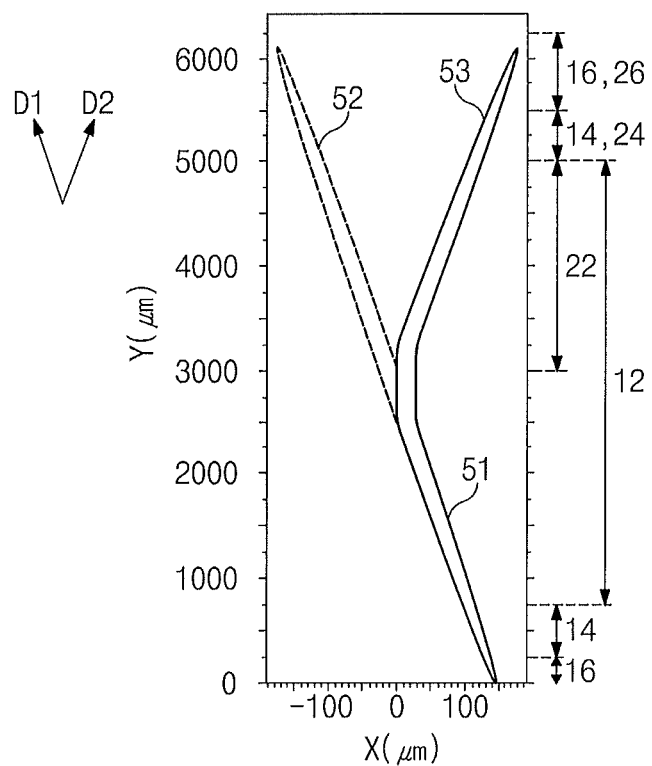
FIGS. 4A and 4B are graphs illustrating a transmission component of light in an on state and a reflection component of the light whose results are calculated by the overlap integral.
Figure 4B:
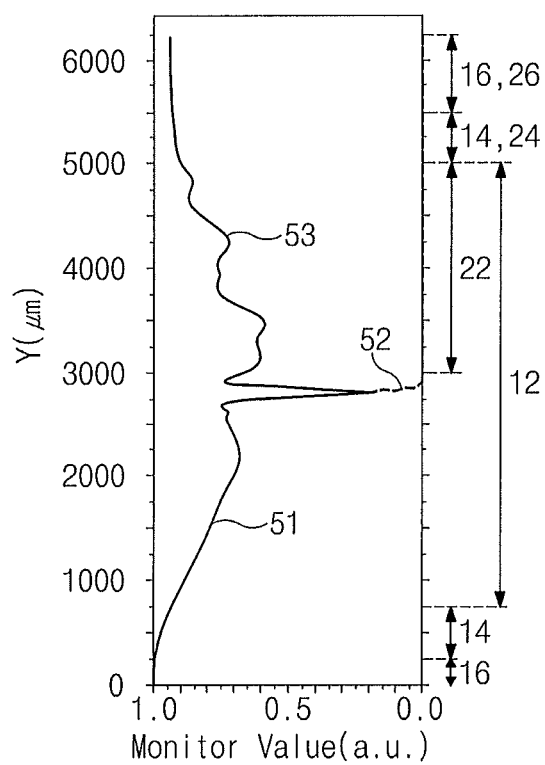

FIGS. 4A and 4B are graphs illustrating a transmission component of light in an on state and a reflection component of the light whose results are calculated by the overlap integral.

Referring to FIGS. 4A and 4B, when the selective reflection part 30 is turned on, the incident component 51 of the light may propagate in the first direction D1, and the reflection component 53 thereof may be output in the second direction D2 crossing the first direction D1.

When optical power normalized to 1 is input in the first direction D1, the reflection component 53 of about 0.942 may be output in the second direction D2. The incident light may be lost by about 0.058 at the selective reflection part 30, and a portion of the light may be output as the transmission component 52. The transmission component 52 may be output in the second direction D2 through a design variable optimization Accordingly, the optical switch device according to the embodiment of the inventive concept may change transmission or reflection of light rapidly.

A method of manufacturing the optical switch device configured as described above will now be described.

FIGS. 5 through 12 are cross-sectional views sequentially illustrating processes in the method of manufacturing the optical switch device according to the current embodiment of the present invention.

Figure 5:
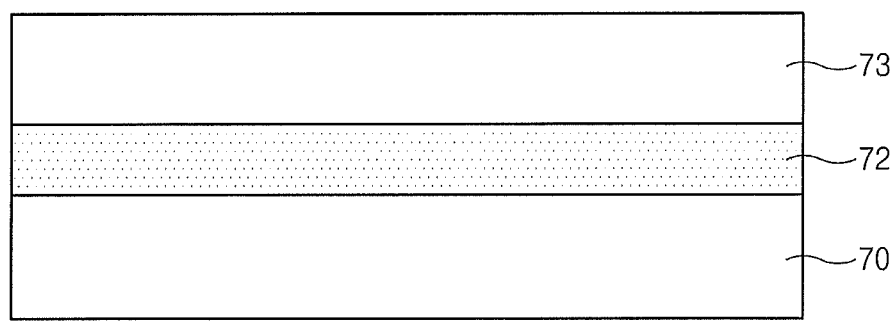
FIGS. 5 through 12 are cross-sectional views sequentially illustrating processes in a method of manufacturing the optical switch device according to the embodiment of FIG. 1.

Referring to FIG. 5, the lower clad 72 and a core layer 73 are formed on the substrate 70. The lower clad 72 and the core layer 73 may include silica or silicon oxide formed using a flame hydrolysis deposition method, a thermal oxidation method, or a chemical vapor deposition method. The lower clad 72 and the core layer 73 may be different in refractive index from each other.

Figure 6:
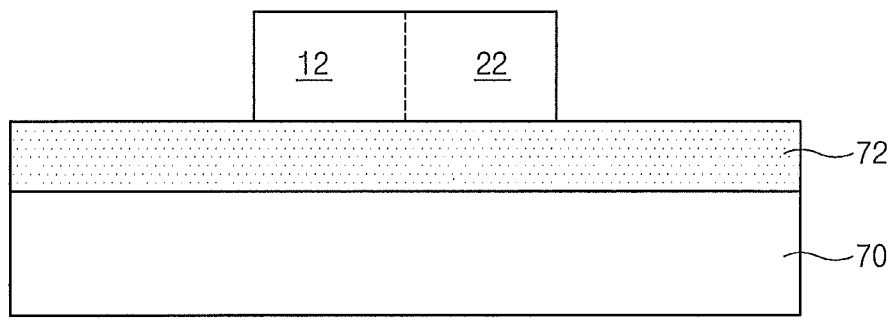

Referring to FIGS. 1 and 6, the core layer 73 is patterned using a photolithograpy process to form the first and second optical waveguides 10 and 20. The first optical waveguide 10 and the second optical waveguide 20 may include the first multi mode core 12 and the second multi mode core 22, respectively. The photolithography process may include a patterning process of forming a photoresist pattern selectively exposing the core layer 73, and an etching process of removing the core layer 73 exposed by the photoresist pattern. The patterning process may include a spin coating process of applying photoresist on an entire surface of the core layer 73, an exposure process of exposing the photoresist to ultraviolet ray through a photomask, and a development process of developing the photoresist exposed to the ultraviolet ray.

Figure 7:
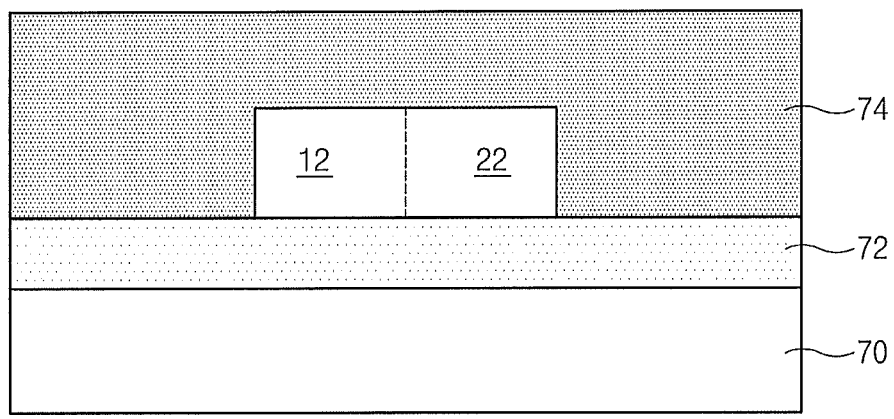

Referring to FIG. 7, the upper clad 74 covering the first and second multi mode cores 12 and 22 is formed. The upper clad 74 may include silica or silicon oxide formed on the entire surface of the substrate 70 using a flame hydrolysis deposition method or a chemical vapor deposition method in the same manner as that of the lower clad 72.

Figure 8:
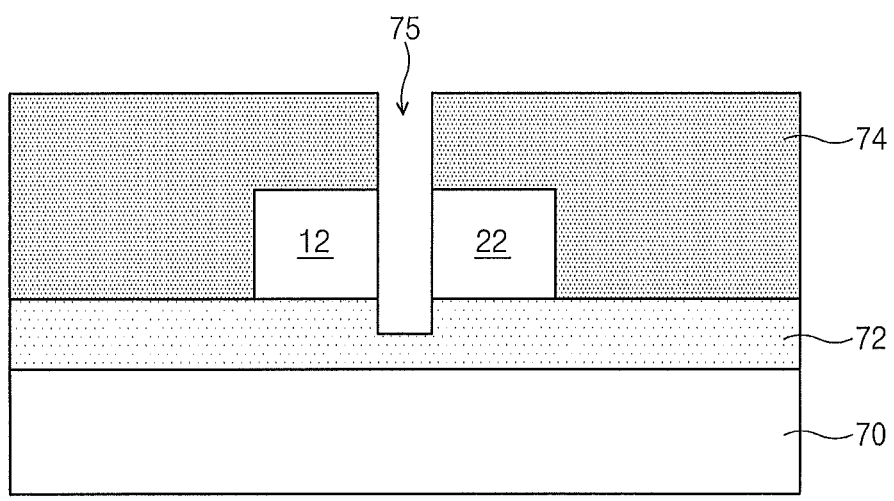

Referring to FIG. 8, a trench 75 passing through the first and second multi mode cores 12 and 22 is formed. The trench 75 may be formed from the upper surface of the lower clad 72 to the upper surface of the substrate 70. Both ends of the trench 75 in the longitudinal direction may be adjacent to the first multi mode core 12. The trench 75 may be adjacent to the upper clad 74 at the periphery of the first multi mode core 12.

The trench 75 may be formed through a photolithography process. The photolithography process may include a patterning process of forming a photoresist pattern selectively exposing the first multi mode core 12 and the upper clad 74, and an etching process of removing the first multi mode core 12 exposed by the photoresist pattern. The upper clad 74, the first multi mode core 12, and the lower clad 72 may be anisotropically etched using a dry etching method.

Figure 9:
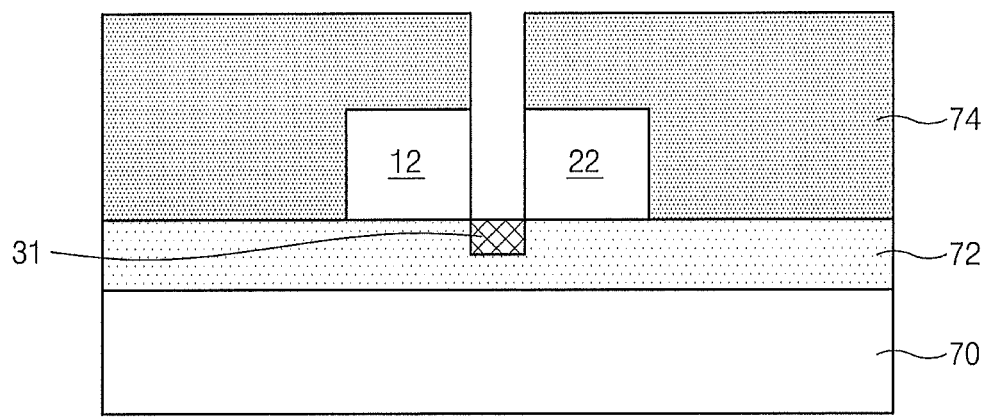

Referring to FIG. 9, the lower reflection part 31 is formed from the bottom of the trench 75 up to an upper surface level of the lower clad 72. The lower reflection part 31 may include a lower thermo-optic polymer formed using a spin coating method and a dry etching method. The lower thermo-optic polymer may have the same refractive index as that of the lower clad 72 at a room temperature. The lower thermo-optic polymer may fill the trench 75 using the spin coating method.

The lower thermo-optic polymer may be formed on an entire surface of the upper clad 74. Thereafter, the lower thermo-optic polymer may be removed from the upper clad 74 using the dry etching method. The lower thermo-optic polymer within the trench 75 may be removed down to the same level as that of the lower clad 72. The dry etching method may include a time etching method. The level of the upper surface of the lower thermo-optic polymer within the trench 75 may be checked by an alpha step profiler.

Figure 10:
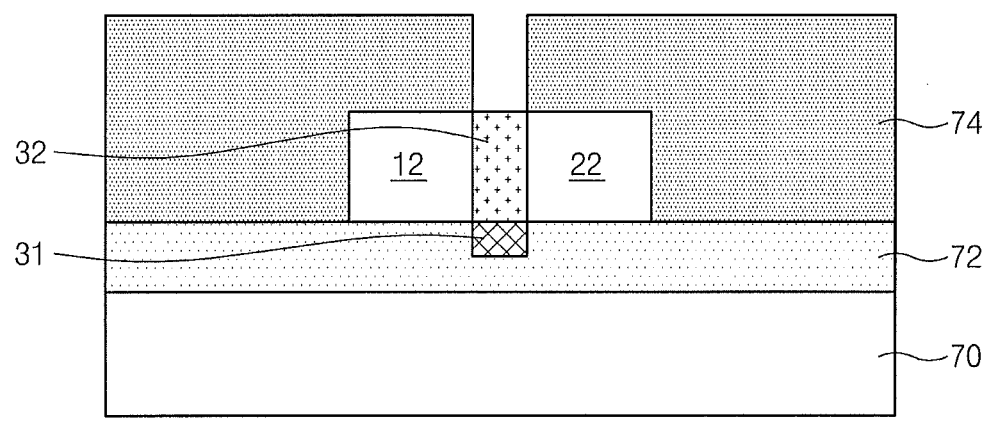

Referring to FIG. 10, the core reflection part 32 is formed from the lower reflection part 31 up to the level of the upper surface of the first multi mode core 12. The core reflection part 32 may include a core thermo-optic polymer within the trench 75, and the core thermo-optic polymer may be formed using a spin coating method and a dry etching method. The core thermo-optic polymer may have the same refractive index as that of the first multi mode core 12 at a room temperature. The core thermo-optic polymer may fill the trench 75 using the spin coating method and be formed on the entire surface of the upper clad 74. The core thermo-optic polymer may be removed from the entire surface of the upper clad 74 using the dry etching method and be removed within the trench 75 down to the level of the upper surface of the first multi mode core 12. The level of the upper surface of the core thermo-optic polymer may be checked also by an alpha step profiler.

Figure 11:
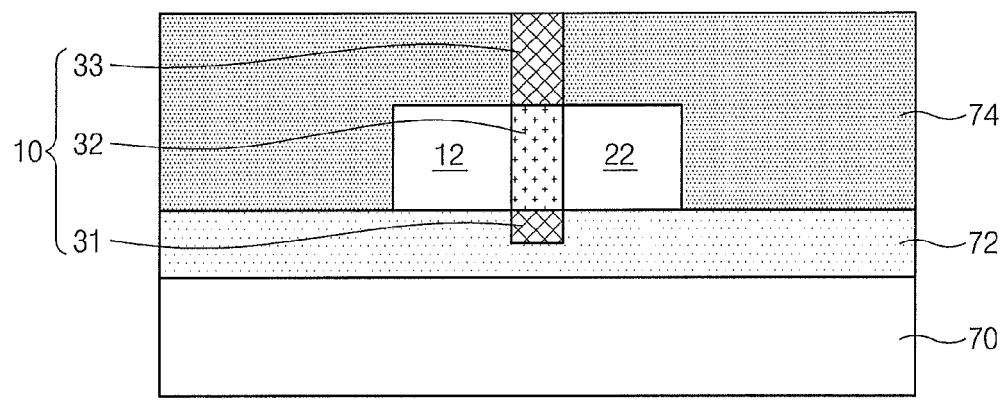

Referring to FIG. 11, the upper reflection part 33 is formed on the core reflection part 32 within the trench 75. The upper reflection part 33 may include an upper thermo-optic polymer within the trench 75, and the upper thermo-optic polymer may be formed using a spin coating method and a dry etching method. The upper thermo-optic polymer may have the same refractive index as that of the upper clad 74 at a room temperature. The upper thermo-optic polymer may fill the trench 75 using the spin coating method and be formed on the entire surface of the upper clad 74. The upper thermo-optic polymer may be flatly removed to the surface of the upper clad 74 using the dry etching method.

Figure 12:
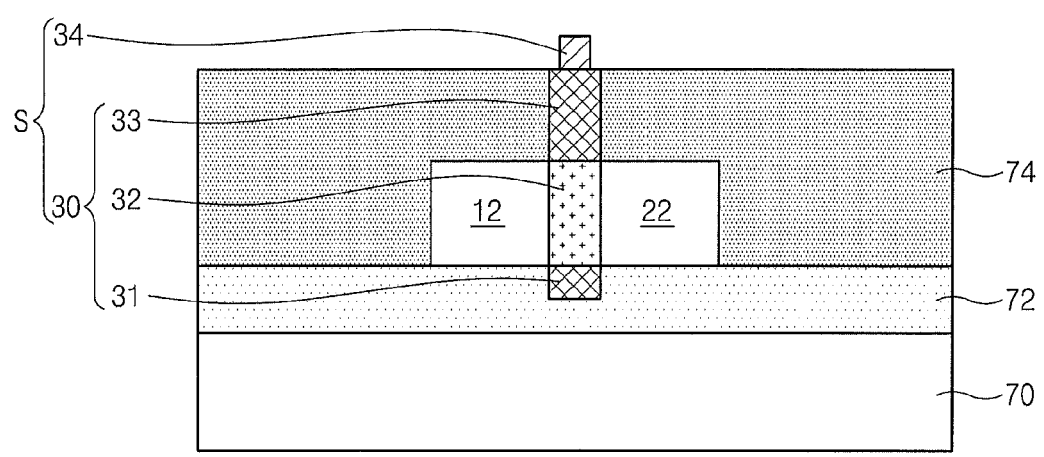

Referring to FIG. 12, the heater electrode 34 is formed on the selective reflection part 30. The heater electrode 34 may include a resistive metal. The heater electrode 34 may be formed through a resistive metal deposition process and a photolithography process. The resistive metal deposition process may include an e-beam evaporation deposition method or a thermal evaporation deposition method in which the resistive metal is formed on an entire surface of the selective reflection part 30 and the upper clad 74. The photolithography process may include a patterning process of forming a photoresist pattern selectively exposing the resistive metal, and an etching process of removing the resistive metal exposed by the photoresist pattern. The etching process method may include a wet or dry etching method. The heater electrode 34 may include a resistive metal below the photoresist pattern, and the resistive metal is protected from the etching process and remains on the selective reflection part 30. The resistive metal may include an alloy of nickel and chrome, titanium, or gold.

Accordingly, in the method of manufacturing the optical switch device according to the embodiment of the inventive concept, the selective reflection part 30 including the thermo-optic polymer within the trench 75 passing through the first multi mode core 12 may be formed, and the heater electrode 34 stacked on the selective reflection part 30 may be formed.

Figure 13:
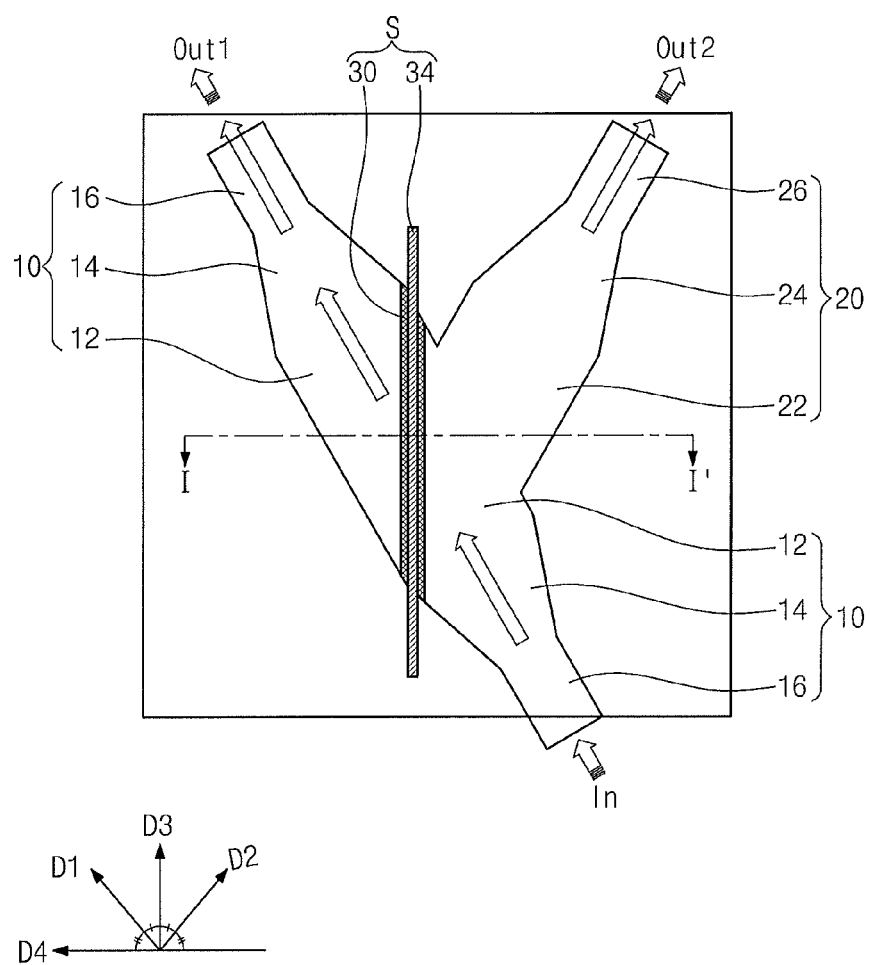
FIG. 13 is a plan view illustrating an optical switch device according to an embodiment of the present invention.
Figure 14:
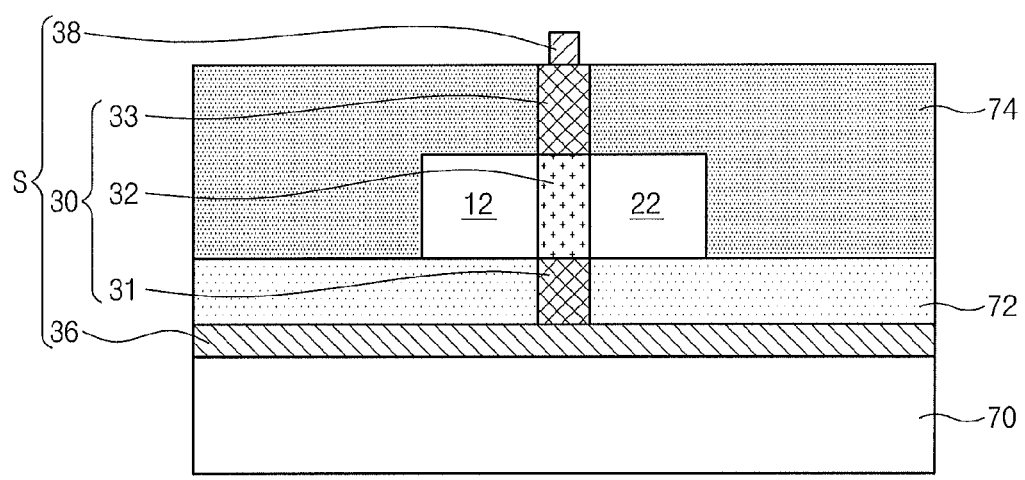
FIG. 14 is a cross-sectional view taken along line I-I' of FIG. 13.

FIG. 13 is a plan view illustrating an optical switch device according to an embodiment of the present invention. FIG. 14 is a cross-sectional view taken along line I-I' of FIG. 13.

Referring to FIGS. 13 and 14, the optical switch device according to the current embodiment may include the switching part S. The switching part S uses an electro-optic effect to control light transmitted within the first optical waveguide 10 in the first direction D1 and selectively reflect the light to the second optical waveguide 20 in the second direction D2. The switching part S may include the selective reflection part 30, a lower electrode 36, and an upper electrode 34. The selective reflection part 30 has a variable refractive index depending on the intensity and direction of an applied electric field. The lower electrode 36 and the upper electrode 34 apply an electric field to the selective reflection part 30. The selective reflection part 30 satisfies a critical angle of light according to a variation of the refractive index, so as to transmit light in the first direction D1 within the first optical waveguide 10 or totally reflect light in the second direction D2 to the second optical waveguide 20. The selective reflection part 30 may selectively output light to the first output end Out1 of the first optical waveguide 10 and the second output end Out2 of the second optical waveguide 20.

Since a radio frequency electrical signal is applied to the lower electrode 36 and the upper electrode 34, the selective reflection part 30 quickly switches light propagating within the first optical waveguide 10 in the first direction D1 or in the second direction D2. Accordingly, the optical switch device according to the embodiment of the inventive concept may have a simple structure for changing a light path.

The first and second optical waveguides 10 and 20 may be disposed between the lower clad 72 and the upper clad 74 on the substrate 70. The upper clad 74 may surround the first and second optical waveguides 10 and 20. The first and second optical waveguides 10 and 20 may include silica or silicon oxide doped with impurities. The lower clad 72 and the upper clad 74 may include silica or silicon oxide.

The first optical waveguide 10 may include the first single mode cores 16 having the input end In and the first output end Out 1 through which light is input and output, the first multi mode core 12 disposed between the first single mode cores 16, and the first tapering cores 14 connecting the first multi mode core 12 to the first single mode cores 16.

The second optical waveguide 20 may include the second multi mode core 22 connected to the first multi mode core 12 of the first optical waveguide 10, the second single mode core 26 that output light propagating within the second multi mode core 22 to the second output end Out 2, and the second tapering core 24 disposed between the second single mode core 26 and the second multi mode core 22.

The first optical waveguide 10 and the second optical waveguide 20 are formed of substantially the same material. Thus, for convenience in description, the left side of the switching part S illustrated in FIG. 13 is exemplified as the first multi mode core 12 of the first optical waveguide 10, and the right side thereof is exemplified as the second multi mode core 22 of the second optical waveguide 20.

The switching part S may be disposed at a cross or junction region where the first and second multi mode cores 12 and 22 are connected to each other. The switching part S may extend in the third direction D3 between the first and second directions D1 and D2. The angle between the first direction D1 and the third direction D3 and that between the second direction D2 and the third direction D3 may be symmetrically the same. Thus, the switching part S may extend in the third direction D3 crossing the first multi mode core 12 extending in the first direction D1.

The switching part S may include the selective reflection part 30, the lower electrode 36, and the upper electrode 34. The selective reflection part 30 selectively reflects light from the first optical waveguide 10 to the second optical waveguide 20 according to a variation of the refractive index. The lower electrode 36 and the upper electrode 34 apply an electric field to the selective reflection part 30. The lower electrode 36 and the upper electrode 34 may be a control part using an electric field to control the selective reflection part 30. A radio frequency electrical signal of an alternating current component may be applied to the lower electrode 36 and the upper electrode 34. The lower electrode 36 and the upper electrode 34 may include a metal having high conductivity. The lower electrode 36 may be disposed between the substrate 70 and the lower clad 72. The lower electrode 36 may be formed on the entire surface of the substrate 70. The lower electrode 36 and the upper electrode 34 may be in contact with or be spaced apart from the selective reflection part 30. The selective reflection part 30 includes an electro-optic polymer, which is non-conductive. Thus, the selective reflection part 30 may be electrically spaced apart from the lower electrode 36 and the upper electrode 34. For example, the selective reflection part 30 may extend down to the depth of the lower clad 72 between the lower electrode 36 and the lower surface of the first multi mode core 12.

The selective reflection part 30 may include the lower reflection part 31 having the same upper surface as that of the lower clad 72, the core reflection part 32 disposed on the lower reflection part 31 having the same level as that of the first and second optical waveguides 10 and 20, and the upper reflection part 33 disposed on the core reflection part 32 and having the same lower surface as that of the upper clad 74. The lower reflection part 31 and the lower clad 72 may have the same refractive index, and the upper reflection part 33 and the upper clad 74 may have the same refractive index. The core reflection part 32 and the first multi mode core 12 may have the same refractive index.

The refractive index of the core reflection part 32 may be varied according to the direction and intensity of an electric field. According to a variation of the refractive index, the selective reflection part 30 may transmit or totally reflect light propagating in the first direction D1 within the first multi mode core 12. Thus, the selective reflection part 30 may change the path of light propagating within the first multi mode core 12, according to an electric field induced by the lower electrode 36 and the upper electrode 34.

For example, the selective reflection part 30 may include an electro-optic polymer, the refractive index of which is decreased according to the application of an electric field. The electro-optic polymer may include a material, the refractive index of which quickly changes according to the direction and the intensity of an electric field. The electro-optic polymer may be dielectrically polarized. The dielectric polarization may occur in a predetermined direction within the electro-optic polymer. Thus, when an electric field is applied in the direction of the dielectric polarization or in the opposite direction thereto, the refractive index of the electro-optic polymer may be changed.

Substantially, an electric field does not nearly affect the refractive index of silica or silicon oxide constituting the first and second optical waveguides 10 and 20. When the refractive index of the electro-optic polymer is the same as that of silica or silicon oxide, the electro-optic polymer can transmit light. When the refractive index of the electro-optic polymer is significantly lower than that of silica or silicon oxide, the electro-optic polymer can totally reflect light. When the refractive index of the electro-optic polymer is changed, and the incident angle of light reaches the critical angle, the electro-optic polymer can totally reflect light.

As the intensity of an electric field increases, the change of the refractive index of the electro-optic polymer may be accelerated. For example, the electro-optic polymer may include lower and upper electro-optic polymers corresponding respectively to the lower and upper reflection parts 31 and 33, and a core electro-optic polymer corresponding to the core reflection part 32.

The first optical waveguide 10 and the selective reflection part 30 may extend in the first direction D1 and the third direction D3, respectively. The incident angle of light may be fixed as an angle formed by the first direction D1 and the fourth direction D4 perpendicular to the third direction D3. The selective reflection part 30 may totally reflect light propagating within the first optical waveguide 10, according to the change of the refractive index due to the electro-optic effect. That is, the selective reflection part 30 may transmit light propagating in the first direction D1, or totally reflect light in the second direction D2. The selective reflection part 30 may switch an incident light by an electric field induced between the lower electrode 36 and the upper electrode 34.

Accordingly, the optical switch device according to the embodiment of the inventive concept may have a simple structure for changing a light path.

A method of manufacturing the optical switch device configured as described above will now be described.

FIGS. 15 through 24 are cross-sectional views sequentially illustrating processes in the method of manufacturing the optical switch device according to the current embodiment of the present invention.

Figure 15:
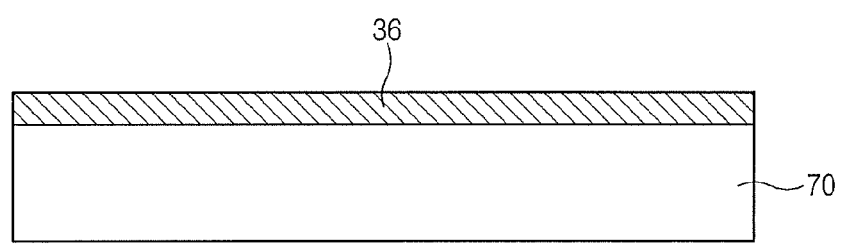
FIGS. 15 through 24 are cross-sectional views sequentially illustrating processes in a method of manufacturing the optical switch device according to the embodiment of FIG. 13.

Referring to FIG. 15, the lower electrode 36 is formed on the substrate 70. The lower electrode 36 may include a metal layer having high conductivity. The lower electrode 36 may be formed on the entire surface of the substrate 70 through a metal layer deposition process. The metal layer may be deposited on the entire surface of the substrate 70 by using an e-beam evaporation deposition method or a thermal evaporation deposition method.

Figure 16:
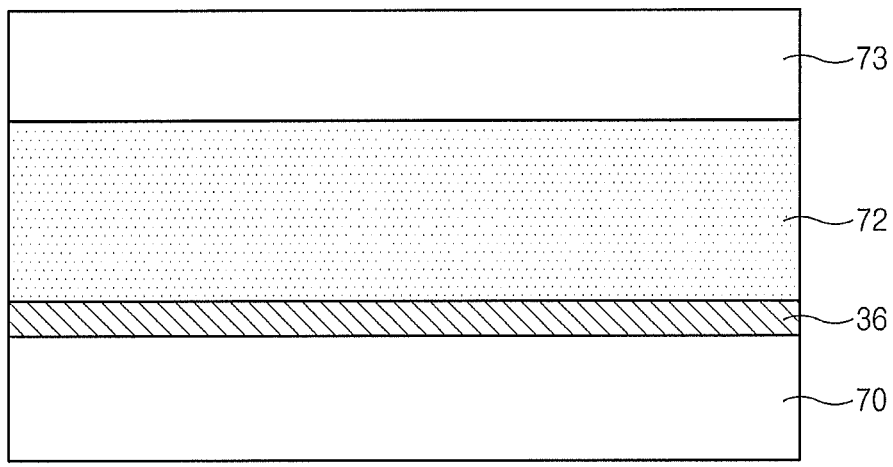

Referring to FIG. 16, the lower clad 72 and the core layer 73 are formed on the entire surface of the substrate 70 provided with the lower electrode 36.

The lower clad 72 may include silica or silicon oxide formed using a flame hydrolysis deposition method, a thermal oxidation method, or a chemical vapor deposition method. The lower clad 72 and the core layer 73 may be different in refractive index from each other.

Figure 17:
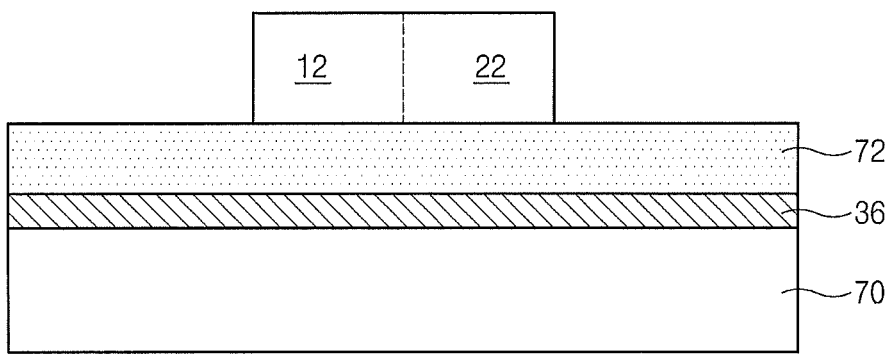

Referring to FIGS. 13 and 17, the core layer 73 is patterned using a photolitograpy process to form the first and second optical waveguides 10 and 20. The first optical waveguide 10 and the second optical waveguide 20 may include the first multi mode core 12 and the second multi mode core 22, respectively. The photolithography process may include a patterning process of forming a photoresist pattern selectively exposing the core layer 73, and an etching process of removing the core layer 73 exposed by the photoresist pattern. The patterning process may include a spin coating process of applying photoresist on the entire surface of the core layer 73, an exposure process of exposing the photoresist to ultraviolet ray through a photomask, and a development process of developing the photoresist exposed to the ultraviolet ray.

Figure 18:
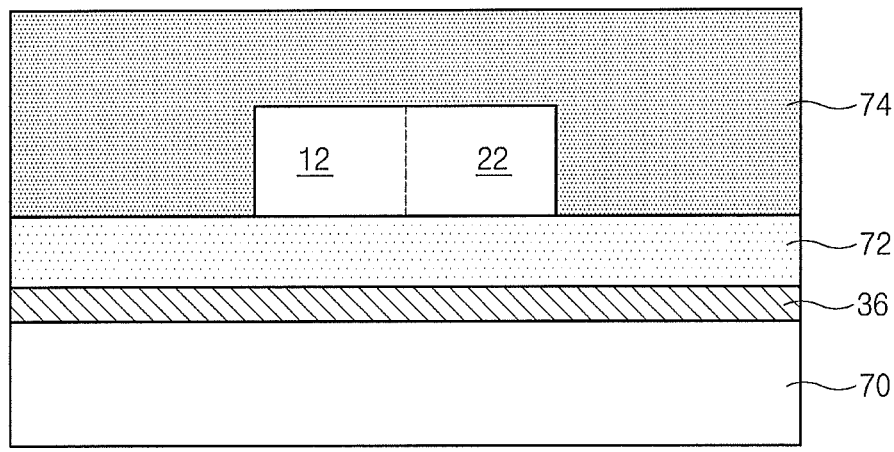

Referring to FIG. 18, the upper clad 74 covering the first and second multi mode cores 12 and 22 is formed. The upper clad 74 may include silica or silicon oxide formed on the entire surface of the substrate 70 using a flame hydrolysis deposition method or a chemical vapor deposition method in the same manner as that of the lower clad 72.

Figure 19:
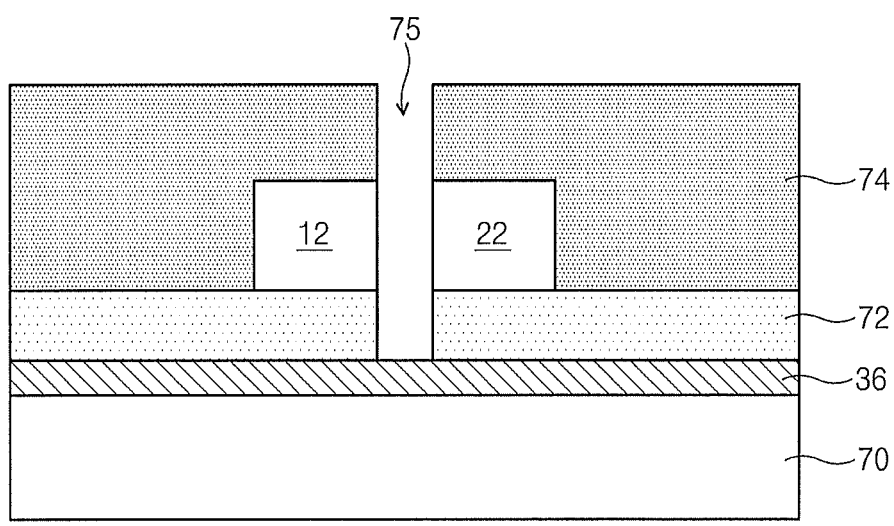

Referring to FIG. 19, the trench 75 passing through the first and second multi mode cores 12 and 22 is formed. The depth of the trench 75 may be extended from the upper surface of the lower clad 72 to the upper surface of the substrate 70. Both ends of the trench 75 in the longitudinal direction may be adjacent to the first multi mode core 12. The trench 75 may be adjacent to the upper clad 74 at the periphery of the first multi mode core 12. The trench 75 may be formed through a photolithography process. The photolithography process may include a patterning process of forming a photoresist pattern selectively exposing the first multi mode core 12 and the upper clad 74, and an etching process of removing the first multi mode core 12 exposed by the photoresist pattern. The upper clad 74, the first multi mode core 12, and the lower clad 72 may be anisotropically etched using a dry etching method.

Figure 20:
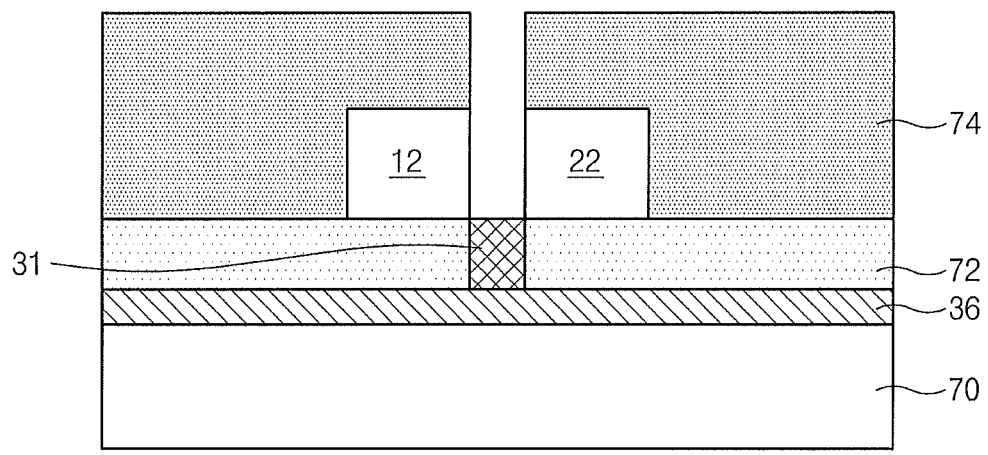

Referring to FIG. 20, the lower reflection part 31 is formed from the bottom of the trench 75 up to an upper surface level of the lower clad 72. The lower reflection part 31 may include a lower electro-optic polymer formed using a spin coating method and a dry etching method. The lower electro-optic polymer may have the same refractive index as that of the lower clad 72 at a room temperature. The lower electro-optic polymer may fill the trench 75 using the spin coating method. The lower electro-optic polymer may be formed on the entire surface of the upper clad 74. Thereafter, the lower electro-optic polymer may be removed from the upper clad 74 using the dry etching method. The lower electro-optic polymer within the trench 75 may be removed down to the same level as that of the lower clad 72. The level of the upper surface of the lower electro-optic polymer within the trench 75 may be checked by an alpha step profiler.

Figure 21:
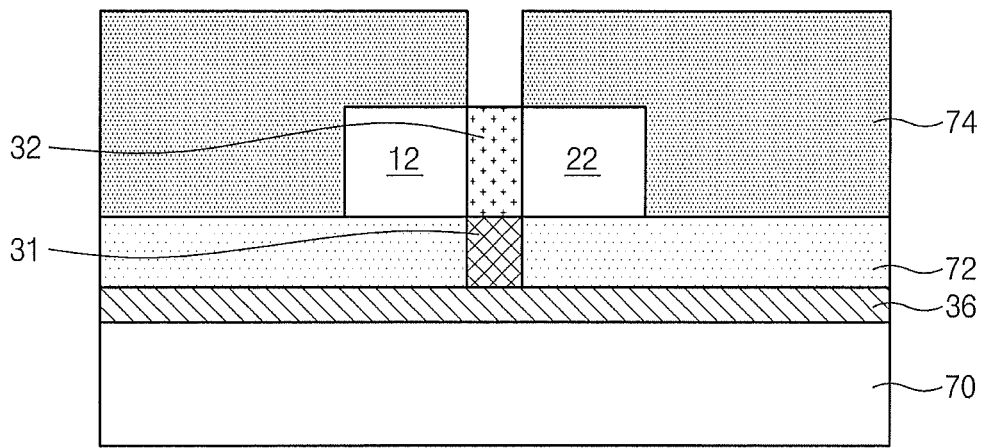

Referring to FIG. 21, the core reflection part 32 is formed from the lower reflection part 31 up to the level of the upper surface of the first multi mode core 12. The core reflection part 32 may include a core electro-optic polymer within the trench 75, and the core electro-optic polymer may be formed using a spin coating method and a dry etching method. The core electro-optic polymer may fill the trench 75 using the spin coating method and be formed on the entire surface of the upper clad 74. The core electro-optic polymer may be removed from the entire surface of the upper clad 74 using the dry etching method, and be removed within the trench 75 down to the level of the upper surface of the first multi mode core 12. The level of the upper surface of the core electro-optic polymer may be checked also by an alpha step profiler.

Figure 22:
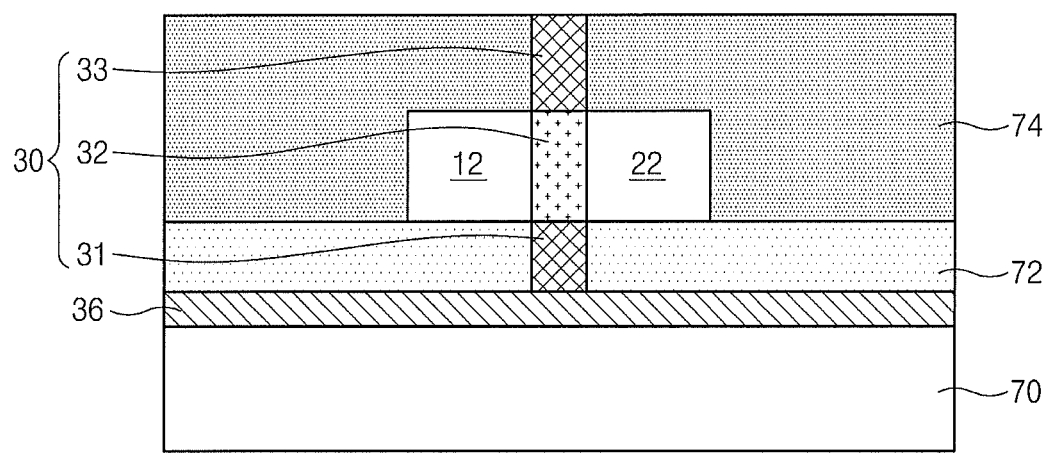

Referring to FIG. 22, the upper reflection part 33 is formed on the core reflection part 32 within the trench 75. The upper reflection part 33 may include an upper electro-optic polymer within the trench 75, and the upper electro-optic polymer may be formed using a spin coating method and a dry etching method. The upper electro-optic polymer may fill the trench 75 using the spin coating method and be formed on the entire surface of the upper clad 74. The upper electro-optic polymer may be flatly removed to the upper surface of the upper clad 74 using the dry etching method.

Figure 23:
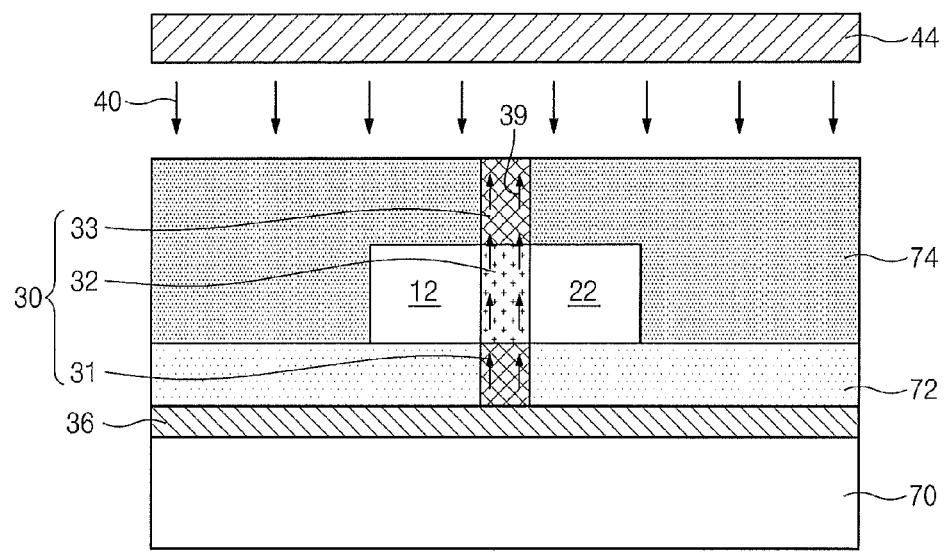

Referring to FIG. 23, the electro-optic polymer of the selective reflection part 30 is dielectrically polarized in a predetermined direction. Dielectric polarization 39 may be defined as a phenomenon in which, when an induced electric field 40 is applied to a dielectric that is an electrical insulator, electrically polarized molecules are entirely arrayed in an opposite direction to that of the induced electric field 40, so that the dielectric is polarized in a predetermined direction. Thus, the dielectric polarization 39 occurs within the selective reflection part 30 by the electric field 40 induced between a poling electrode 44 and the lower electrode 36. Although not shown, the dielectric polarization 39 may occur within the selective reflection part 30 in the other drawings except for FIG. 23. The poling electrode 44 may be spaced apart from the upper surface of the upper clad 74. A very high voltage of a direct current (DC) component may be applied between the poling electrode 44 and the lower electrode 36.

Figure 24:
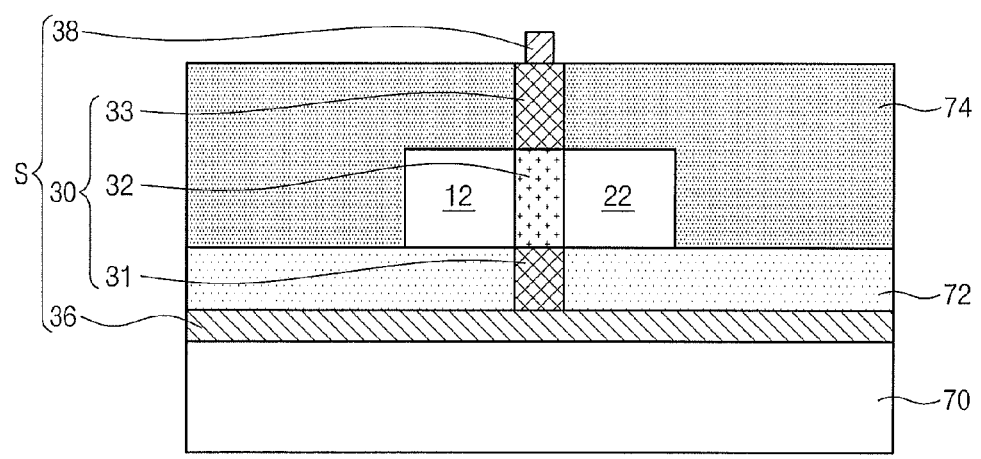

Referring to FIG. 24, the upper electrode 34 is formed on the selective reflection part 30. The upper electrode 34 may include a metal layer having high conductivity. The upper electrode 34 may be formed using a metal layer deposition process and a photolithography process in the same manner as that of the lower electrode 36.

Thus, in the method of manufacturing the optical switch device according to the current embodiment, the selective reflection part 30 may be formed within the trench 75 passing through the first multi mode core 12 between the lower electrode 36 and the upper electrode 34.

Figure 25:
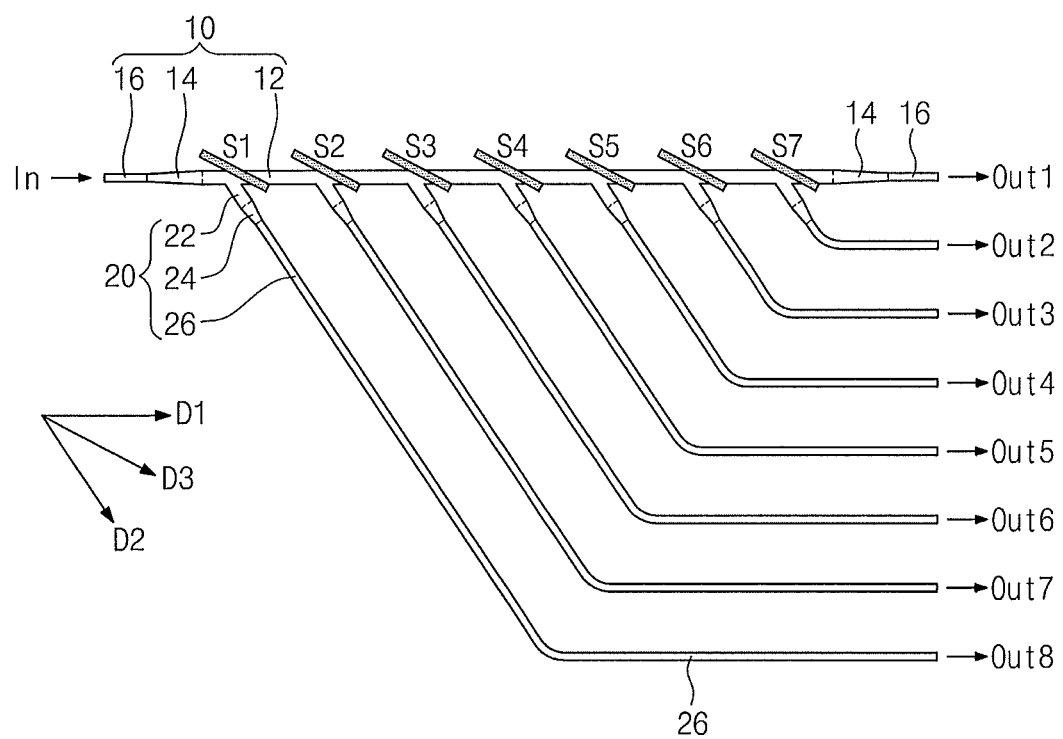
FIG. 25 is a plan view illustrating an optical switch device according to an embodiment of the present invention.

FIG. 25 is a plan view illustrating an optical switch device according to an embodiment of the present invention.

Referring to FIG. 25, the optical switch device according to the current embodiment includes the first optical waveguide 10 extending in the first direction D1, the second optical waveguide 20 that is provided in plurality and connected in the second direction D2 to the first optical waveguide 10, and switching parts S1 to S7 that extend in the third direction D3 wherever the second optical waveguides 20 are connected to the first optical waveguide 10.

Since the switching parts S1 to S7 extend in the third direction D3 wherever the second optical waveguides 20 are connected to the first optical waveguide 10, the optical switch device according to the embodiment of the inventive concept may have a simple structure for changing a light path.

The first optical waveguide 10 may include the first single mode cores 16 extending to the input end In and the first output end Out1 through which light is input and output, and the first multi mode core 12 disposed between the first single mode cores 16 and the first tapering cores 14. The second optical waveguides 20 extend from the first multi mode core 12. The input end In and the first output end Out1 may correspond to the first single mode cores 16 extending in the first direction D1 on both sides of the first multi mode core 12. Light input and output through the first single mode cores 16 and the first tapering cores 14 may be transmitted in the first direction D1 by the first multi mode core 12. The first multi mode core 12 can transmit light in the first direction D1 at the switching parts S1 to S7. The first multi mode core 12 can transmit light, which is totally reflected at the switching parts S1 to S7, to the second multi mode cores 22.

The switching parts S1 to S7 may be spaced apart from one another and may be arrayed in the first direction D1 along the first multi mode core 12. As described according to the previous embodiments, the switching parts S1 to S7 may include selective reflection parts that selectively reflect light from the first optical waveguide 10 to the second optical waveguide 20, and control parts that control the selective reflection parts according to temperature or an electric field.

Each of the second optical waveguides 20 may include the second multi mode core 22 connected to the first multi mode core 12, the second tapering core 24 connected to the opposite end of the second multi mode core 22 to the first multi mode core 12, and the second single mode core 26 extending from the second tapering core 24.

The second multi mode cores 22 and the second tapering cores 24 may extend in the second direction D2. The second single mode cores 26 may extend in the second direction D2 from the second tapering cores 24. Furthermore, the second single mode cores 26 may extend in the first direction D1 from the second direction D2. The direction of the second single mode cores 26 may be changed in a curvature without a curvature loss. The second single mode cores 26 may emit light to from second to eighth output ends Out2 through Out8. The number of the output ends Out1 to Out8 may be greater by one than the number of the switching parts S1 to S7. In FIG. 25, the number of the output ends Out1 to Out8 is exemplified as 1×8, and the output ends Out1 to Out8 are sequentially numbered downward. However, the present invention is not limited thereto, and thus, 1×N output ends may be provided in another form.

Light input to the first optical waveguide 10 may be output in an operation order of the switching parts S1 to S7. For example, when the second switching part S2 operates, the light may be output to the seventh output end Out7. When the switching parts S1 to S7 do not operate, the light input to the input end In of the first optical waveguide 10 is output to the first output end Out1.

Thus, the optical switch device according to the current embodiment may include 1×N switching parts S disposed at all branch points where N second optical waveguides 20 are connected to the single first optical waveguide 10.

Figure 26:
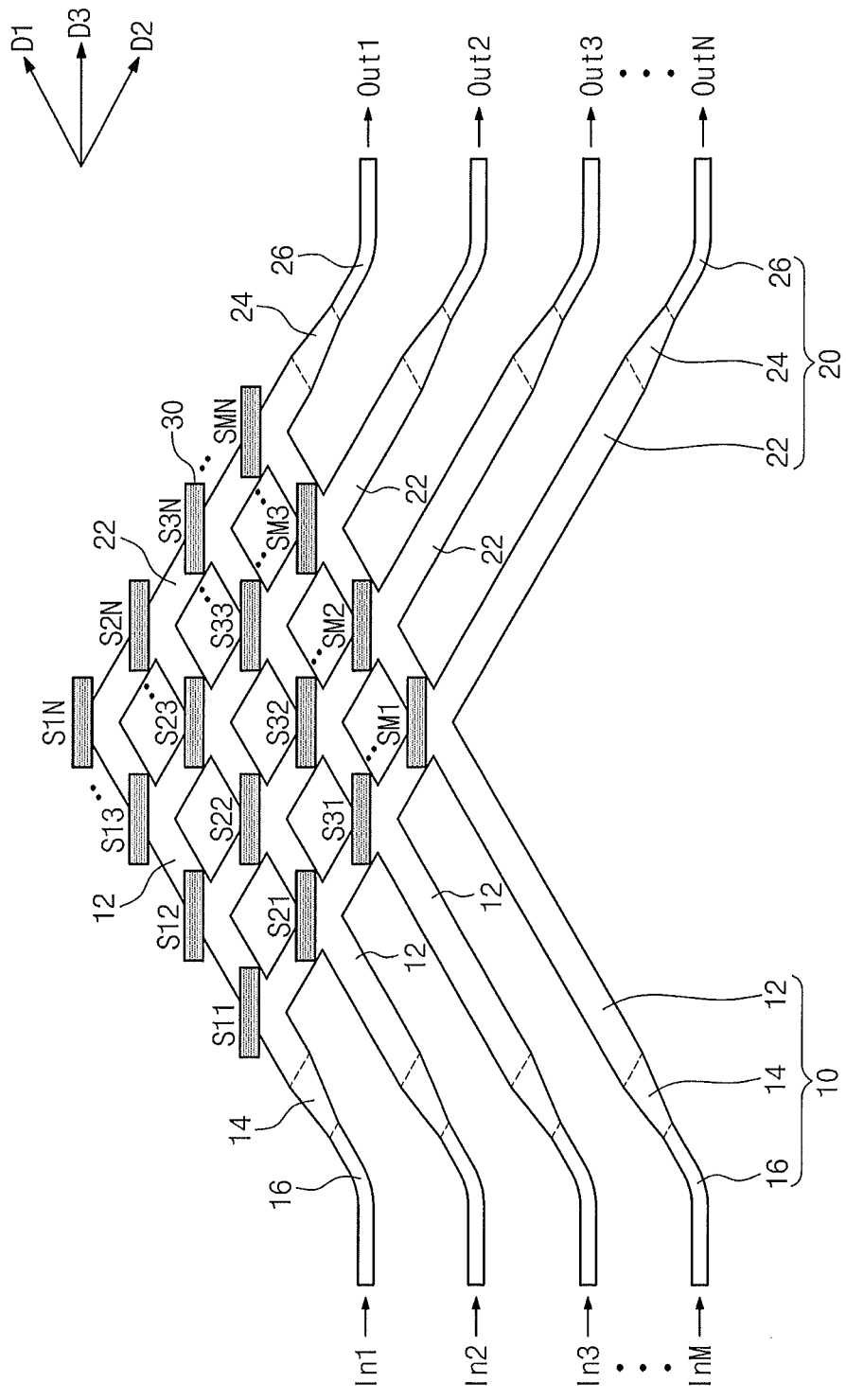
FIG. 26 is a plan view illustrating an optical switch device according to an embodiment of the present invention.

FIG. 26 is a plan view illustrating an optical switch device according to an embodiment of the present invention.

Referring to FIG. 26, the optical switch device according to the current embodiment may include M first optical waveguides 10 extending in a first direction D1, N second optical waveguides 20 extending in a second direction D2, and M×N switching parts S11 to SMN extending in a third direction D3 at nodes of a matrix defined by the M first optical waveguides 10 and the N second optical waveguides 20.

Since the M×N switching parts S11 to SMN are disposed in the third direction D3 wherever the N second optical waveguides 20 cross the M first optical waveguides 10, a light path changing structure of the optical switch device can be simplified.

The M first optical waveguides 10 may include the first multi mode cores 12 extending in the first direction D1. The N second optical waveguides 20 may include the second multi mode cores 22 extending in the second direction D2 crossing the first direction D1. The first multi mode cores 12 and the second multi mode cores 22 may be arrayed in a matrix form. The switching parts S11 to SMN may be disposed at all the nodes where the first multi mode cores 12 cross the second multi mode cores 22 in the matrix form. The switching parts S11 to SMN may extend in the third direction D3. The switching parts S11 to SMN may cross the first multi mode cores 12 and the second multi mode cores 22. As described according to the first and second embodiments, the switching parts S11 to SMN may include selective reflection parts that selectively reflect light from the first optical waveguides 10 to the second optical waveguides 20 and control parts that control the selective reflection parts according to temperature or an electric field.

The first optical waveguides 10 may include the first single mode cores 16 and the first tapering cores 14 extending in the first direction D1 from the first multi mode cores 12. The first single mode cores 16 of the first optical waveguides 10 may extend in the third direction D3. Furthermore, the first single mode cores 16 may extend in the first direction D1 from the third direction D3. The direction of the first single mode cores 16 may be changed in a curvature without a curvature loss.

The second optical waveguides 20 may include the second single mode cores 26 and the second tapering cores 24 extending in the second direction D2 from the second multi mode cores 22. The second single mode cores 26 of the second optical waveguides 20 may extend in the third direction D3. Furthermore, the second single mode cores 26 may extend in the third direction D3 from the second direction D2 in a curvature without a curvature loss. The first single mode cores 16 may extend from input ends In1 through InM. The second single mode cores 26 may extend from output ends Out1 to OutN. The number of the switching parts S11 to SMN is obtained by multiplying the number of the input ends In1 to InM and the number of the output ends Out1 to OutN.

In FIG. 26, the first multi mode cores 12 are sequentially numbered from 1 to M, and the second multi mode cores 22 are sequentially numbered from 1 to N, so that the number of the switching parts S11 to SMN is M×N. However, the present invention is not limited thereto, and thus, an optical switch device may be configured in various matrix forms.

Light input from the input ends In1 to InM may be output to the output ends Out1 to OutN according to operations of the switching parts S11 to SMN, which will be described later. The output of light input to the first optical waveguides 10 may be determined according to the operation of at least one selected from the switching parts S11 to SMN. Then, the light may be output through the second optical waveguide 20 connected to the selected one. For example, when the switching part S23 operates, light input from the second input end In2 is output to the second output end Out2.

In more detail, light input through the first optical waveguide 10 connected to the second input end In2 may be reflected to the second optical waveguide 20 at the switching part S23, and then, be output to the second output ends Out2. The switching parts S21, S22, S23, . . . , S2M sharing the single first optical waveguide 10 may take effective priorities of switching light, according to distances from the second input end In2. When the switching part S23 operates first, although the switching part S2N operates, light may be output to the second output end Out2 through the second optical waveguide 20. At this point, if the switching part S22 also operates, the light may be output to the third output end Out3 through the second optical waveguide 20.

Thus, the optical switch device according to the current embodiment may include the M×N switching parts S11 to SMN disposed at the nodes of the matrix defined by the M first optical waveguides 10 and the N second optical waveguides 20.

Figure 27:
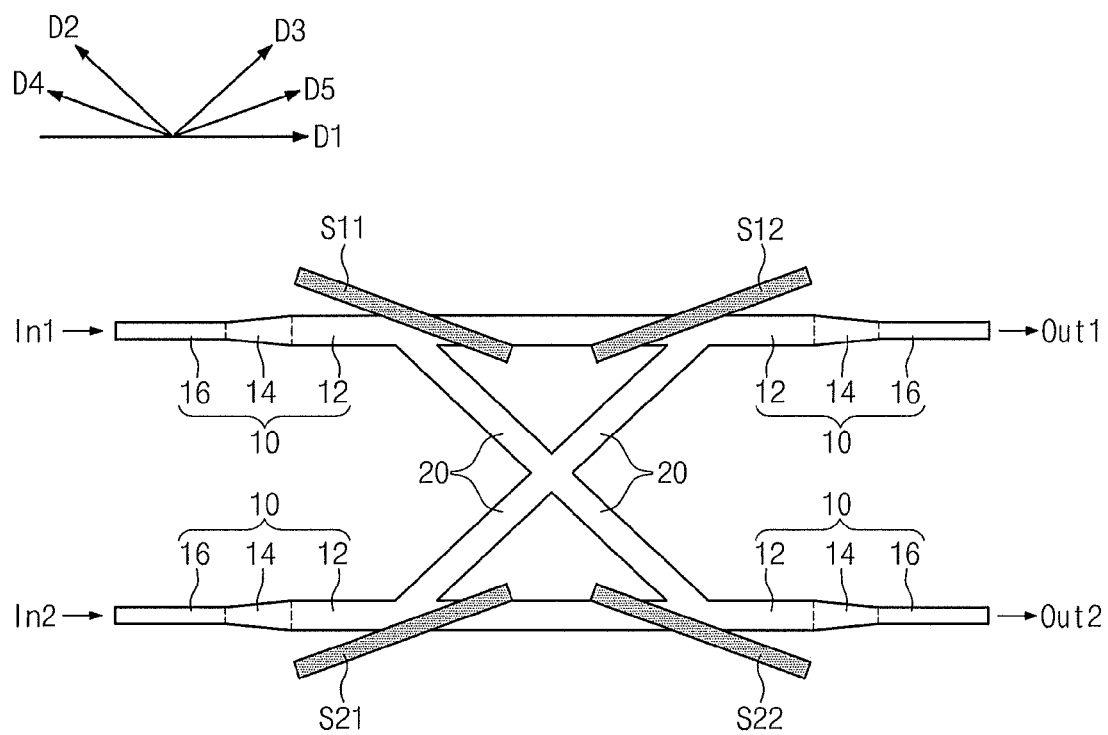
FIG. 27 is a plan view illustrating an optical switch device according to an embodiment of the present invention.

FIG. 27 is a plan view illustrating an optical switch device according to an embodiment of the present invention.

Referring to FIG. 27, the optical switch devices according to the current embodiment may include 2×2 switching parts S11, S12, S21, and S22. The second optical waveguides 20 extending in a second direction D2 and a third direction D3 cross each other between the first optical waveguides 10 extending in a first direction D1. The 2×2 switching parts S11, S12, S21, and S22 extend in a fourth direction D4 and a fifth direction d5 at points where the second optical waveguides 20 are connected to the first optical waveguides 10. The switching parts S11 and S22 extend in the fourth direction D4 at the points where the second optical waveguide 20 is connected in the second direction D2 to the first optical waveguides 10. The switching parts S12 and S21 extend in the fifth direction D5 at the points where the second optical waveguide 20 is connected in the third direction D3 to the first optical waveguides 10.

Since a pair of the switching parts S11 and S22 or a pair of the switching parts S12 and S21 may be parallel to each other at the points where one or more second optical waveguides 20 are connected to the first optical waveguides 10 between the first optical waveguides 10, a light path changing structure of the optical switch device can be simplified.

The first optical waveguides 10 may be parallel to each other in the first direction D1. The first optical waveguides 10 may extend to the first and second input ends In1 and In2 and the first and second output ends Out1 and Out2. The first optical waveguides 10 may include the first single mode cores 16, the first tapering cores 14, and the first multi mode cores 12. The first single mode cores 16 and the first tapering cores 14 extend to the first and second input ends In1 and In2 and the first and second output ends Out1 and Out2. The first multi mode cores 12 are connected to the second optical waveguides 20 between the first tapering cores 14. The first multi mode cores 12 may transmit light, which is transmitted through the switching parts S11, S12, S21, and S22, in the first direction D1. When light is totally reflected in the second and third directions D2 and D3 at the switching parts S11 and S21, the first multi mode cores 12 may transmit the light to the second optical waveguides 20. When light is totally reflected at the switching parts S12 and S22, the first multi mode cores 12 may transmit the light in the first direction D1.

The second optical waveguides 20 may include second multi mode cores. The second optical waveguides 20 may extend in the second direction D2 and the third direction D3 between the first multi mode cores 12. The second optical waveguides 20 may cross each other between the first multi mode cores 12. The second optical waveguides 20 may transmit light in the second direction D2 and the third direction D3 without a light interference in a cross region. A cross angle may be increased to minimize the loss and interference of light propagating in the cross region.

The switching parts S11, S12, S21, and S22 may be spaced from each other in the first direction D1 along the first multi mode cores 12. The switching parts S11 and S12 disposed at the same first optical waveguide 10 may be connected to the second optical waveguides 20 and be spaced apart from each other in the first direction D1. In the same manner, the switching parts S21 and S22 disposed at the other one of the same first optical waveguides 10 may be connected to the second optical waveguides 20 and be spaced apart from each other in the first direction D1. As described according to the first and second embodiments, the switching parts S11, S12, S21, and S22 may include selective reflection parts that selectively reflect light from the first optical waveguide 10 to the second optical waveguide 20 and control parts that control the selective reflection parts according to temperature or an electric field.

In FIG. 27, the number of the input ends In1 and In2 and the number of the output ends Out1 and Out2 are two, and the number of the switching parts S11, S12, S21, and S22 is 2×2, and the switching parts S11, S12, S21, and S22 are numbered according to the order of the first multi mode cores 12 and distances from the input ends In1 and In2. However, the present invention is not limited thereto, and thus, as the number of input ends and output ends increases, switching parts of an optical switch device may be arrayed in various matrix forms such as 2×N, N×2, and N×N.

The operations of the switching parts S11, S12, S21, and S22 may be linked with one another. For example, when the second switching part S11 operates, the second switching part S22 may also operate. Light input from the first input end In1 may be transmitted along the second optical waveguide 20 by the operation of the second switching part S11 and be output to the second output end Out2 by the operation of the second switching part S22. When the switching part S11 is not operated, light input from the first input end In1 may be output to the first output end Out1 through the switching part S12. In the same manner, the operations of the switching parts S21, S12 may be linked with one another.

Thus, when the second optical waveguides 20 cross each other between the first optical waveguides 10, the optical switch device according to the current embodiment may include 2×2, 2×N, N×2, and N×N switching parts extending in different directions at the first optical waveguides 10.

According to the above-described embodiments of the present invention, since the selective reflection part having a variable refractive index according to temperature or an electric field between the first and second optical waveguides, a simple light path changing structure can be designed, and the size of a device can be significantly reduced.

In addition, the selective reflection part uses a radio frequency electrical signal to quickly switch light, propagating within the first optical waveguide, in first and second directions.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An optical switch device comprising:
   one or more first optical waveguides extending in a first direction;
   one or more second optical waveguides connected to the first optical waveguides in a second direction crossing the first direction;
   one or more switching parts configured to control light transmitted in the first direction within the first optical waveguide connected with the second waveguide, to selectively reflect the light to the second waveguide extending in the second direction; and
   an upper clad and a lower clad disposed respectively on an upper side and a lower side of the first and second optical waveguides;
   wherein the switching part includes a selective reflection part configured to transmit or reflect light, the selective reflection part including a thermo-optic polymer having a variable refractive index that varies according to temperature;
   wherein the selective reflection part includes a core thermo-optic polymer disposed within the first optical waveguide, and upper and lower thermo-optic polymers disposed respectively within the upper clad and the lower clad; and
   wherein the core thermo-optic polymer is made from a different material than the upper and lower thermo-optic polymers.

2. The optical switch device of claim 1, wherein the switching part further comprises:
   a control part configured to control the transmitting and reflecting of the light at the selective reflection part.

3. The optical switch device of claim 2, wherein the control part comprises a heater electrode heating the thermo-optic polymer.

4. The optical switch device of claim 3, wherein the heater electrode has a smaller line width than that of the upper thermo-optic polymer formed in a trench, and is disposed on the upper clad and the upper thermo-optic polymer.

5. The optical switch device of claim 2, wherein the selective reflection part includes an electro-optic polymer having a variable refractive index that varies based on a change of an electric field.

6. The optical switch device of claim 5, further comprising an upper clad and a lower clad disposed respectively on an upper side and a lower side of the first and second optical waveguides,
   wherein the selective reflection part comprises a core electro-optic polymer disposed within the first optical waveguide, and upper and lower electro-optic polymers disposed respectively within the upper clad and the lower clad.

7. The optical switch device of claim 6, wherein the control part comprises upper and lower electrodes applying the electric field to the electro-optic polymer.

8. The optical switch device of claim 7, wherein the upper electrode has a smaller line width than that of the upper electro-optic polymer formed in a trench, and is disposed on the upper clad and the upper electro-optic polymer, and the lower electrode is disposed on an entire surface below the lower clad and the lower electro-optic polymer.

9. The optical switch device of claim 1, wherein the switching part extends in a third direction between the first direction and the second direction.

10. The optical switch device of claim 9, wherein the number of the second optical waveguides connected in the second direction to the first optical waveguide is N, and the number of the switching parts is 1×N.

11. The optical switch device of claim 10, wherein the first optical waveguide is connected to an input end and a first output end, and the second optical waveguides are connected to second to N+1$^{th}$ output ends.

12. The optical switch device of claim 9, wherein the number of the first optical waveguides extending in the first direction is M, and the number of the second optical waveguides extending in the second direction is N, and the M first optical waveguides and the N second optical waveguides are arrayed in a matrix form, and the number of the switching parts is M×N.

13. The optical switch device of claim 12, wherein the M first optical waveguides are connected respectively to M input ends, and the N second optical waveguides are connected respectively to N output ends.

14. The optical switch device of claim 1, wherein the first optical waveguides extending in the first direction are connected to each other through the second optical waveguide, and a pair of the switching parts are parallel to each other in the first optical waveguides.

15. A method of manufacturing an optical switch device, the method comprising:
   forming a lower clad on a substrate;
   forming a first optical waveguide and a second optical waveguide on the lower clad;
   forming an upper clad on the first optical waveguide and the second optical waveguide;
   forming a trench passing through the upper clad and the first optical waveguide and having a bottom exposing the lower clad;
   forming a selective reflection part within the trench and configured to transmit or reflect light; and
   forming an electrode on the selective reflection part,
   wherein the selective reflection part includes a thermo-optic polymer having a variable refractive index that varies according to temperature;
   wherein the selective reflection part includes a core thermo-optic polymer disposed within the first optical waveguide, and upper and lower thermo-optic polymers disposed respectively within the upper clad and the lower clad; and wherein the core thermo-optic polymer is made from a different material than the upper and lower thermo-optic polymers.

16. The method of claim 15, wherein the forming of the selective reflection part comprises:
    forming a lower reflection part disposed in the bottom of the trench and having the same level as that of an upper surface of the lower clad;
    forming a core reflection part disposed on the lower reflection part and having the same level as those of the first and second optical waveguides; and
    forming an upper reflection part disposed on the core reflection part and having the same level as that of the upper clad.

17. The method of claim 15, further comprising forming a lower electrode between the substrate and the lower clad.

* * * * *